(12) United States Patent
Kim et al.

(10) Patent No.: US 10,752,141 B2
(45) Date of Patent: Aug. 25, 2020

(54) DUAL SCROLL TYPE BI-DIRECTIONAL BLOWER

(71) Applicants: HYUNDAI MOTOR COMPANY, Seoul (KR); KIA MOTORS CORPORATION, Seoul (KR); KBAUTOTECH CO., LTD., Asan-si, Chungcheongnam-do (KR)

(72) Inventors: Mu-Young Kim, Hwaseong-Si (KR); Sang-Ho Kim, Incheon (KR); Chan-Ho Jung, Gunpo-Si (KR); Jong-Moon Yoo, Gyeonggi-do (KR); Joo-Hwan Son, Hwaseong-Si (KR); Young-Bok Sung, Hwaseong-Si (KR); Tae-Hyung Kim, Hwaseong-Si (KR); Min-Hyuk Kwak, Seoul (KR); Seon Chae Na, Yongin-Si (KR); Hee-Dong Kong, Cheonan-Si (KR)

(73) Assignees: Hyundai Motor Company, Seoul (KR); Kia Motors Corporation, Seoul (KR); Kbautotech Co., Ltd., Asan-si, Chungcheongnam-do (KR)

( * ) Notice: Subject to any disclaimer, the term of this patent is extended or adjusted under 35 U.S.C. 154(b) by 17 days.

(21) Appl. No.: 16/169,452

(22) Filed: Oct. 24, 2018

(65) Prior Publication Data
US 2019/0184868 A1  Jun. 20, 2019

(30) Foreign Application Priority Data
Dec. 18, 2017 (KR) .................. 10-2017-0174385

(51) Int. Cl.
*F04D 29/42* (2006.01)
*B60N 2/56* (2006.01)
(Continued)

(52) U.S. Cl.
CPC .......... *B60N 2/5635* (2013.01); *F04D 17/16* (2013.01); *F04D 29/4246* (2013.01);
(Continued)

(58) Field of Classification Search
CPC .... F04D 17/16; F04D 29/4246; F04D 29/441; F04D 29/667; B60N 2/5635
See application file for complete search history.

(56) References Cited

U.S. PATENT DOCUMENTS 5,997,246 A * 12/1999 Humbad ............... F04D 29/667
 415/119
9,624,932 B2 * 4/2017 Jeon ...................... F04D 29/283
(Continued)

FOREIGN PATENT DOCUMENTS

JP   H05-018399 A    1/1993
KR   1992-0002822 Y1  2/1992
(Continued)

*Primary Examiner* — J. Todd Newton
*Assistant Examiner* — Sabbir Hasan
(74) *Attorney, Agent, or Firm* — Morgan, Lewis & Bockius LLP (57) ABSTRACT

A bi-directional blower includes a blower body for guiding for air to flow along an entire circumference scroll shape of an inner space of the blower body. The blower body divides the inner space into an upward space and a downward space to guide air flow. The blower body comprises: an upper discharge case discharging the air flow along the entire circumference scroll shape toward the upward space through an upper discharge port; and a lower discharge case discharging the air flow along the entire circumference scroll shape toward the downward space through a lower discharge port.

15 Claims, 12 Drawing Sheets

(51) Int. Cl.
  *F04D 17/16* (2006.01)
  *F04D 29/44* (2006.01)
  *F04D 29/66* (2006.01)

(52) U.S. Cl.
  CPC ......... *F04D 29/441* (2013.01); *F04D 29/667* (2013.01); *F05B 2240/14* (2013.01); *F05B 2250/502* (2013.01); *F05B 2260/96* (2013.01)

(56) References Cited

U.S. PATENT DOCUMENTS

2016/0369819 A1* 12/2016 Lofy .................. F04D 29/4213
2018/0209440 A1*  7/2018 Kono .................. F04D 29/422

FOREIGN PATENT DOCUMENTS

KR      10-1465513 B1   11/2014
KR   10-2016-0062788 A    6/2016

* cited by examiner

DUAL SCROLL TYPE BI-DIRECTIONAL BLOWER

CROSS-REFERENCE(S) TO RELATED APPLICATIONS

This application claims priority to Korean Patent Application No. 10-2017-0174385, filed on Dec. 18, 2017, which is incorporated herein by reference in its entirety.

TECHNICAL FIELD

The present disclosure relates to a bi-directional blower, and more particularly, to a bi-directional blower suitable for a ventilation seat by applying a sufficient length of a dual scroll structure.

BACKGROUND

The demand for comfortable vehicle indoor environment being recently reinforced is an integrated air conditioning system, and a ventilation seat in addition to a Heating Ventilation and Air Conditioning (HVAC) for maintaining comfortable vehicle indoor environment by integrating cooling/heating and ventilation functions is growingly needed.

Particularly, the ventilation seat mounts a bi-directional blower having a plurality of blades (wings) and a motor to a lower end portion of the seat, and sends air in a lower end of the seat sucked by blade rotation by a motor control to a seat cushion and a seat back, thus providing comfortable ride by circulating wind around the seat.

For this purpose, the bi-directional blower forms two discharge ports in the bi-direction toward the seat cushion and the seat back, and each of the bi-directional discharge ports is formed with a scroll structure for obtaining flow amount. Herein, the scroll means the section in which the space between a blade inside the blower and an outer case thereof is gradually getting bigger.

Accordingly, the ventilation seat maintains more comfortable ride for a seating passenger by the wind circulating around the seat cushion and the seat back through the supply of the flow amount by the bi-directional discharge port of the bi-directional blower.

The contents described in Description of Related Art are to help the understanding of the background of the present disclosure, and may include what is not previously known to those skilled in the art to which the present disclosure pertains.

SUMMARY OF THE DISCLOSURE

An aspect of the present disclosure provides a bi-directional blower mounted to a ventilation seat to require the improvement for reaching performance of a one-directional blower.

Firstly, the improvement is to obtain a sufficient scroll, and this is not possible because the bi-directional blower needs a bi-directional discharge port for distributing wind to each of a seat cushion and a seat back at a lower end of the seat. Secondly, the improvement is to obtain sufficient flow amount, and this is not possible because the bi-directional discharge port shortens the length of the scroll. Thirdly, the improvement is reduction in noise, and this is not possible due to a short length of the scroll and a narrow space of the scroll.

Accordingly, an object of the present disclosure is to provide a dual scroll type bi-directional blower and a ventilation seat capable of forming a blower body on which the bi-directional discharge port is formed as a dual scroll structure divided into upper/lower portions, thus forming the same length of the scroll as that of a one-directional blower, and particularly, improving a chronic shortage of the flow amount and occurrence of the noise of the bi-directional blower by a sufficient length of the scroll in accordance with the dual scroll structure.

According to an exemplary embodiment of the present disclosure, a bi-directional blower includes a blower body guiding for air to flow along the entire circumference scroll shape of an inner space thereof.

The blower body may divide the inner space into upward and downward to guide air flow.

When the air injected into the inner space is discharged in the opposite direction of upward discharge flow and downward discharge flow, the blower body may produce the upward discharge flow and the downward discharge flow, respectively, along the entire circumference scroll shape of the inner space.

The blower body may include a chamfer type blower body, and the chamfer type blower body may be formed with an upper discharge case on which an upper discharge port producing and discharging the upward discharge flow may be formed, and a lower discharge case on which a lower discharge port producing and discharging the downward discharge flow, may be formed.

Each of the upper discharge case and the lower discharge case may be formed in the entire circumference scroll shape. The entire circumference scroll shape of the upper discharge case may be connected from the lower discharge port to the upper discharge port. The entire circumference scroll shape connecting from the lower discharge port to the upper discharge port may be formed with a cross-sectional inclined angle of an upper chamfer, and the cross-sectional inclined angle of the upper chamfer may be reduced from the inclined angle of the upper discharge port to the inclined angle of the lower discharge port.

The entire circumference scroll shape of the lower discharge case may be connected from the upper discharge port to the lower discharge port. The entire circumference scroll shape connecting from the upper discharge port to the lower discharge port may be formed with a cross-sectional inclined angle of a lower chamfer, and the cross-sectional inclined angle of the lower chamfer may be reduced from the inclined angle of the lower discharge port to the inclined angle of the upper discharge port.

Each of the upper discharge port and the lower discharge port may be provided with a blocking film blocking a cross-sectional shape thereof, and the blocking film may change the guiding direction of the discharge amount discharged into each of the upper discharge port and the lower discharge port. The upper discharge port and the lower discharge port may produce the distribution effect of the air flow amount due to the difference between the cross-sectional shapes thereof with respect to each other.

Each of the upper discharge port and the lower discharge port may be provided with an exit rib, and a shape of the exit rib may produce the deflection effect of the air flow amount to the discharge flow amount discharged. A shape deformation of the exit rib may reduce a cross-sectional area of each of the upper discharge port and the lower discharge port. The exit rib may produce the adjustment effect of the discharge flow amount by changing the reduction degree of the cross-sectional area by a size of an exit rib radius.

The blower body may be composed of a stepwise type blower body, and the stepwise type blower body may have an upper step formed on the entire circumference scroll shape connecting from the lower discharge port to the upper discharge port, and the upper step may be formed in the stepped shape. The entire circumference scroll shape connecting from the upper discharge port to the lower discharge port may be formed with a lower step, and the lower step may be formed in the stepped shape.

The blower body may receive a blade rotated by a motor in the inner space.

A ventilation seat in accordance with an exemplary embodiment of the present disclosure includes: a bi-directional blower having a chamfer type or a stepwise type blower body forming an inner space in which a blade rotated by a motor is received, and if the air injected by the rotation of the blade is discharged in the opposite direction of upward discharge flow and downward discharge flow, forming each of the upward discharge flow and the downward discharge flow along the entire circumference scroll shape of the inner space; and a blower duct sending the upward discharge flow to a seat back, and the downward discharge flow to a seat cushion.

The bi-directional blower and the blower duct may be located on a lower portion of the seat cushion.

The blower duct may include: a cushion duct connecting the seat cushion and the chamfer type or stepwise type blower body; and a back duct connecting the seat back and the chamfer type or stepwise type blower body. The bi-directional blower may suck air in a lower space of the seat cushion.

The bi-directional blower applied to the ventilation seat in accordance with the exemplary embodiments of the present disclosure implements the following functions and effects.

Firstly, by forming the same length of the scroll as that of the one-directional blower even in the bi-directional blower, the problem for the length of the scroll that made it difficult to improve performance of the bi-directional blower is solved.

Secondly, by solving the problem for the length of the scroll in the bi-directional blower by a dual scroll structure using upper/lower divisions of the blower body, the effects of the increment in the flow amount of about 10-15% and the noise reduction are great.

Thirdly, since the dual scroll structure can implement the dual scroll structure as the mold shapes of the outermost upper/lower cases, it is possible to maintain the conventional assembly method and material costs.

Fourthly, by changing an R value in the extension line of the chamfer or stepwise shape with respect to the outermost case thereof; it is possible to more enhance the effects of the noise reduction while adjusting the shape of the exit end without generating vortex that deteriorates performance of the flow amount/noise.

Fifthly, it is possible to variously design the bi-directional discharge flow amount in addition to adjusting the discharge flow amount using the adjustment for the shape of the exit end.

DETAILED DESCRIPTION OF SPECIFIC EMBODIMENTS

Hereinafter, exemplary embodiments of the present disclosure are described with reference to the accompanying drawings, and since the exemplary embodiments can be implemented in various different forms by way of example by those skilled in the art, so are not limited to the exemplary embodiments described herein.

Figure 1:
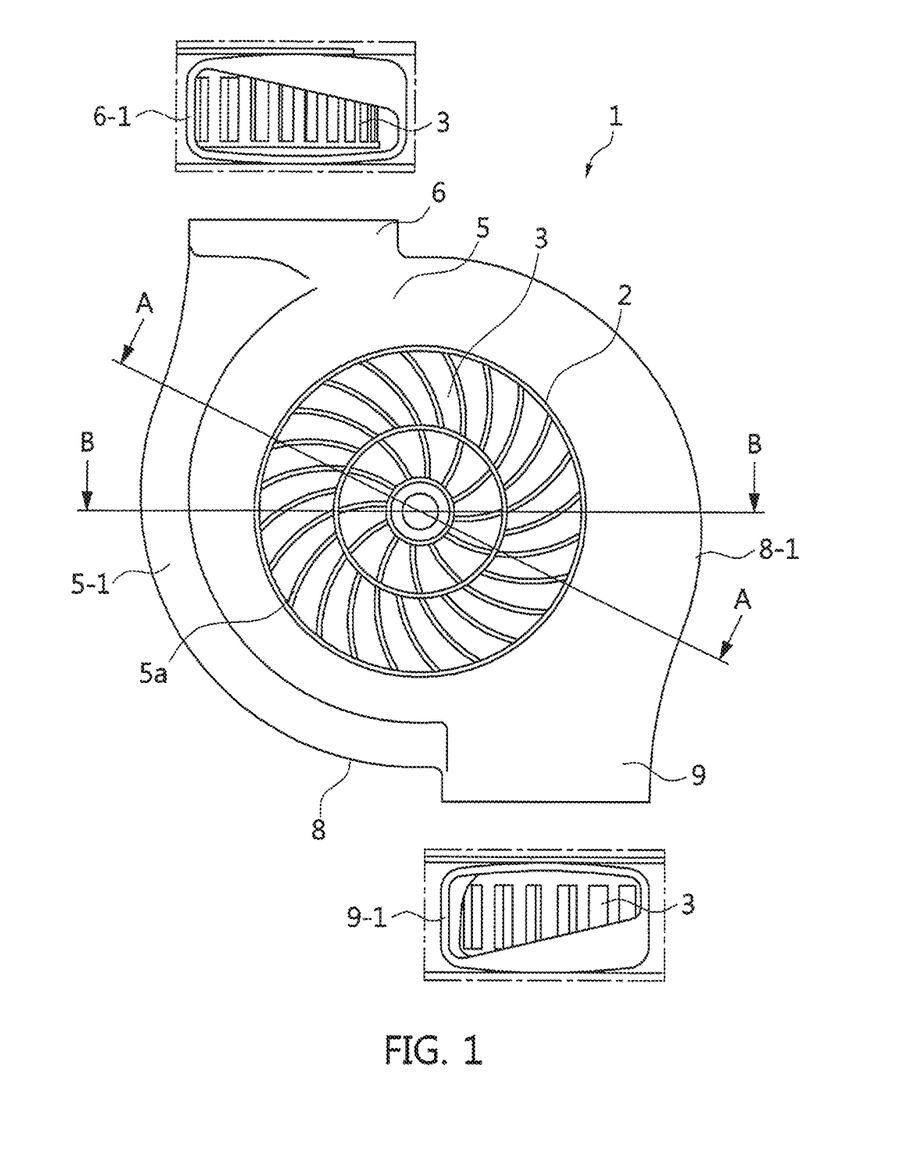
FIG. 1 is a configuration diagram of a dual scroll type bi-directional blower in accordance with an exemplary of the present disclosure.

Referring to FIG. 1, a bi-directional blower 1 includes a motor 2, a blade 3, and a blower body. In this case, the blower body is divided into a chamfer type blower body 4 in FIGS. 1 to 7, or a stepwise type blower body 4-1 in FIG. 8.

As an example, as in FIG. 1, the chamfer type blower body 4 that is main component of the bi-directional blower 1 forms an upper discharge flow and a lower discharge flow, which are the opposite directional discharge of the air injected into an inner space in which the blade 3 rotated by the motor 2 is received, along the entire circumference scroll shape of the inner space. Accordingly, the chamfer type blower body 4 lengthens the diffusion length of the scroll, which is a factor affecting the greatest influence on performance of the flow amount/noise as an upper/lower dual scroll structure, to a sufficient length to more effectively obtain the effects of the increment in flow amount and the noise reduction compared to the conventional cylindrical type blower body. Particularly, the chamfer type blower body 4 can require only the change of the shape of chamfer or stepwise of the mold shape of the chamfer type blower body 4, thus maintaining the same assembly method and material costs as those of the conventional cylindrical blower body.

Specifically, the motor 2 rotates the blade 3, and the blade 3 discharges the external air sucked by the rotation to each of an upper discharge case 5 and a lower discharge case 8 of the chamfer type blower body 4.

The chamfer type blower body 4 forms a chamfer inclined type blower body of the bi-directional blower 1 by coupling the upper discharge case 5 forming an upper chamfer hole 5a for air suction into the upper surface thereof, and the lower discharge case 8 forming a lower chamfer hole 8a for air suction into the lower surface thereof. Particularly, the upper discharge case 5 includes an upper outlet 6 on which an upper discharge port 6-1 discharging the intake air to the outside is formed. The lower discharge case 8 includes a lower outlet 9 on which a lower discharge port 9-1 discharging the intake air to the outside is formed. Furthermore, the upper discharge case 5 and the lower discharge case 8 can be produced as a separate product and then coupled by the fusing, but they may be integrally injection-molded.

Accordingly, the chamfer type blower body 4 externally discharges the intake air in the direction opposite to each other using the upper discharge case 5 and the lower discharge case 8.

Particularly, each of the upper discharge port 6-1 of the upper outlet 6 and the lower discharge port 9-1 of the lower outlet 9 has an inclined blocking film so that a cross-sectional shape thereof is changed from a rectangular shape into an inclined trapezoid shape. As an example, the upper discharge port 6-1 of the upper outlet 6 is formed in the shape of an upper inclined blocking film, while the lower discharge port 9-1 of the lower outlet 9 is formed in the shape of a lower inclined blocking film, thus implementing the difference between the air discharging directions thereof. As a result, the upper discharge port 6-1 can guide the intake air downward compared to the lower discharge port 9-1, while the lower discharge port 9-1 can guide the intake air upward compared to the upper discharge port 6-1. The difference between the flow amounts of the discharging directions of the intake air is more effective in supplying bi-directional air flow amount.

Referring to FIGS. 2 to 5, a blowing function together with a detailed structure of the chamfer type blower body 4 is embodied.

Figure 2A:
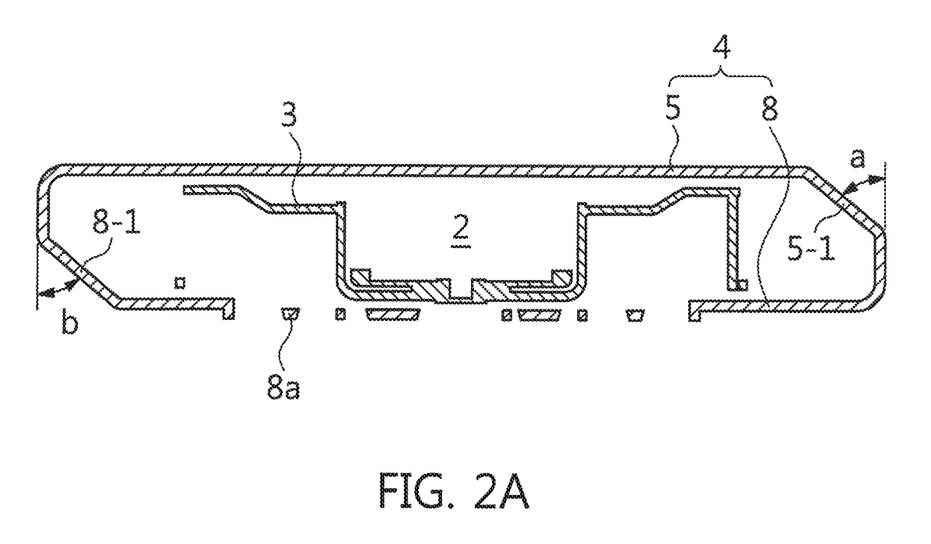
FIGS. 2A and 2B are examples of cross-sectional diagrams taken along line A-A and line B-B illustrating a chamfer type blower body of the bi-directional blower in accordance with an exemplary of the present disclosure.
Figure 2B:
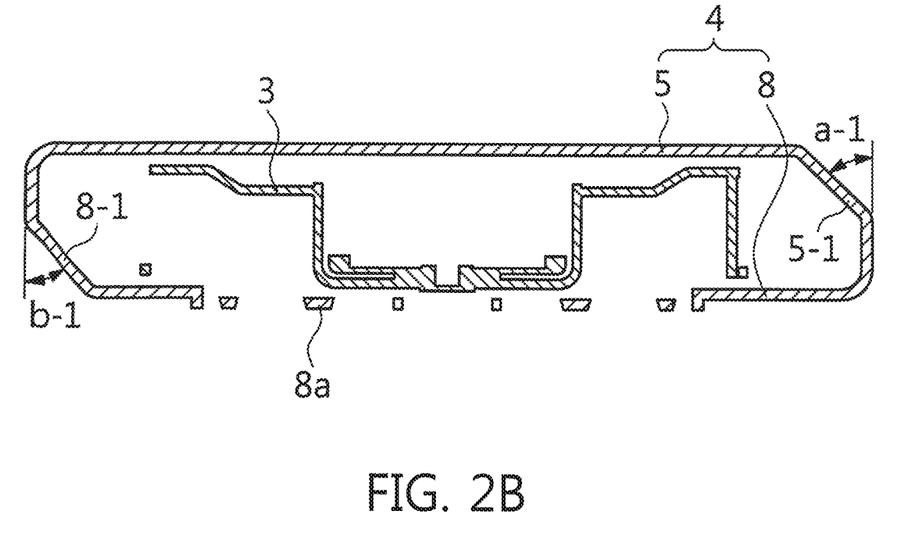

Referring to FIGS. 2A and 2B, the shapes for an upper chamfer 5-1 of the upper discharge case 5 and a lower chamfer 8-1 of the lower discharge case 8 at the state coupling the upper discharge case 5 and the lower discharge case 8 are embodied. In this case, the relationships of a>a-1 and b>b-1 is established, ">" is the sign of inequality indicating the relationship of the sizes of two values, and "a>a-1" means that "a" has a value greater than that of "a-1" and "b>b-1" means that "b" has a value greater than that of "b-1."

As an example, as the upper chamfer 5-1 is changed from the cross-sectional A-A to the cross-sectional B-B in FIGS. 2A and 2B, the cross-sectional inclined angles (a, a-1) of the upper chamfer bent at an acute angle with respect to a virtual vertical line thereof are formed so that the inclined angle (a) of the upper discharge port 6-1 of the upper outlet 6 is the greatest and the inclined angle (a-1) of the lower discharge port 9-1 of the lower outlet 9 is the smallest. Accordingly, an upper dual scroll structure is formed that the diffusion length of the scroll of an upper chamfer path 5-1a, which is a factor affecting the greatest influence on performance of the flow amount/noise and connects from the lower outlet 9 to the upper outlet 6 to end at the upper discharge port 6-1, is sufficiently lengthened.

Furthermore, as the lower chamfer 8-1 is changed from the cross-sectional A-A to the cross-sectional B-B in FIGS. 2A and 2B, the cross-sectional inclined angles (b, b-1) of the lower chamfer bent at an acute angle with respect to a virtual vertical line are formed so that the inclined angle (b) of the lower discharge port 9-1 of the lower outlet 9 is the greatest and the inclined angle (b-1) of the upper discharge port 6-1 of the upper outlet 6 is the smallest. Accordingly, a lower dual scroll structure is formed that the diffusion length of the scroll of a lower chamfer path 8-1a, which is a factor affecting the greatest effect on performance of the flow amount/noise and connects from the upper outlet 6 to the lower outlet 9 to end at the lower discharge port 9-1, is sufficiently lengthened.

Figure 3A:
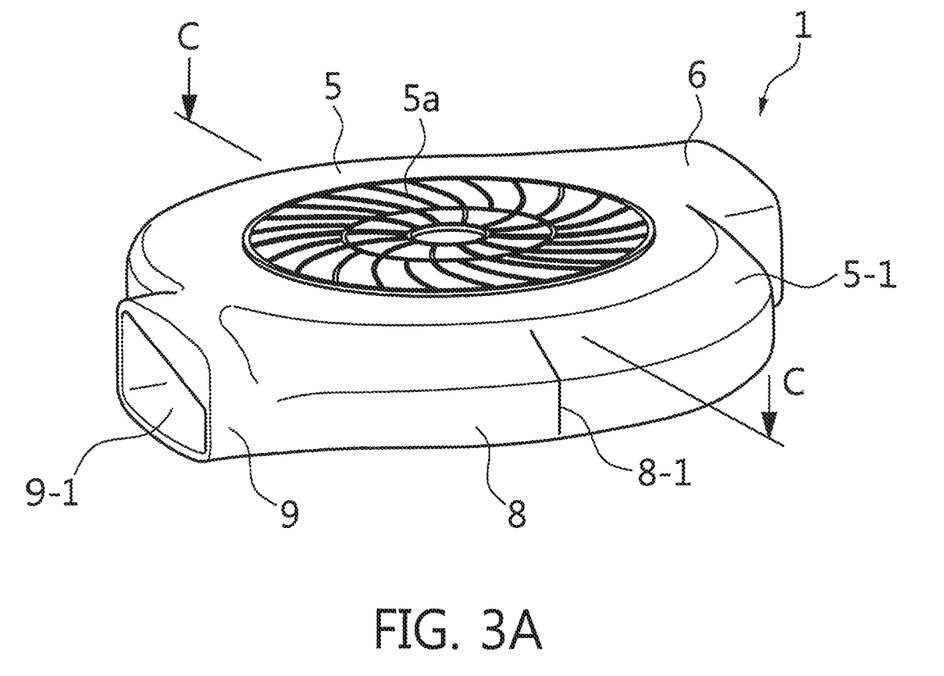
FIGS. 3A and 3B are an upper discharge case of the chamfer type blower body in accordance with an exemplary of the present disclosure and a cross-sectional diagram thereof taken along line C-C.
Figure 3B:
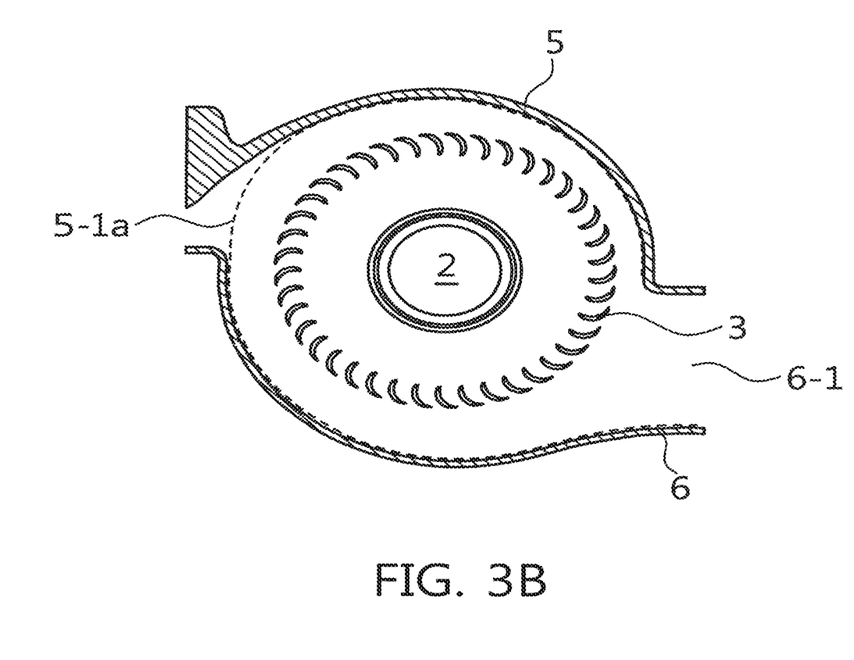
Figure 4A:
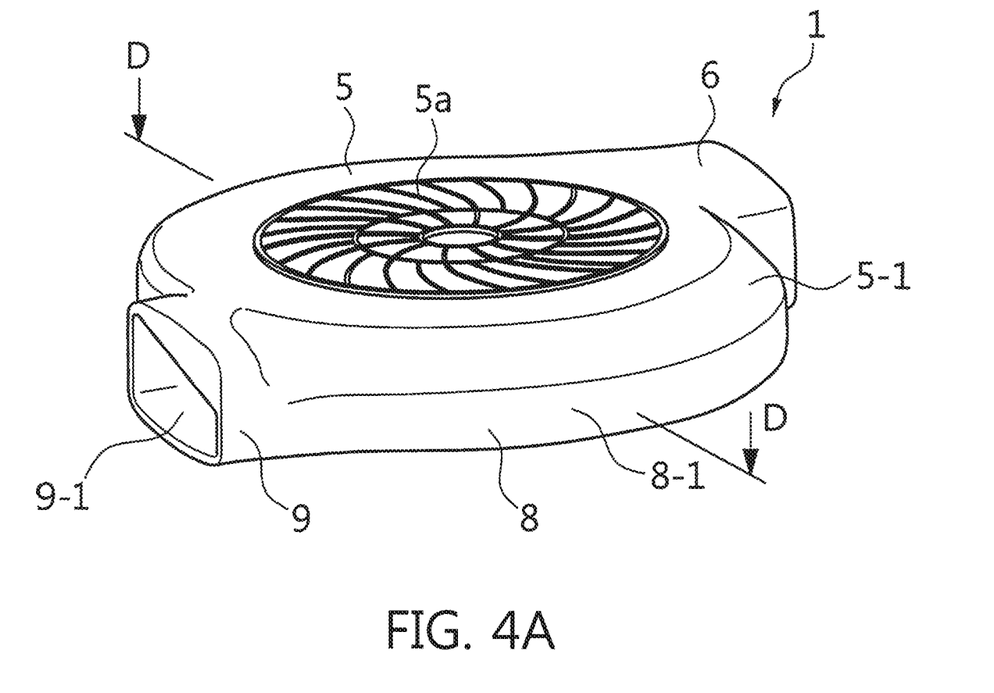
FIGS. 4A and 4B are a lower discharge case of the chamfer type blower body in accordance with an exemplary of the present disclosure and a cross-sectional diagram thereof taken along line D-D.
Figure 4B:
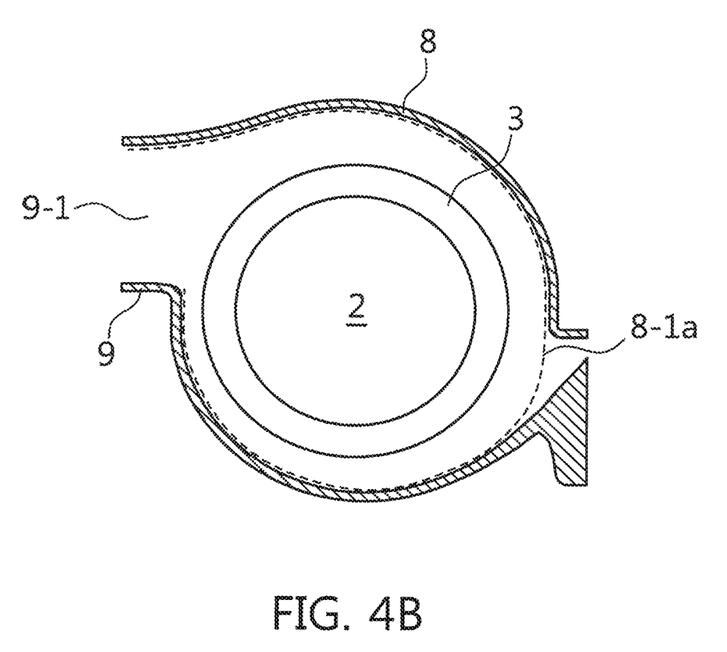

Referring to FIGS. 3A and 3B, the upper chamfer path 5-1a is formed in the entire circumference scroll shape that the upper chamfer 5-1 makes one rotation the chamfer type blower body 4 to be connected to the upper discharge port 6-1. Referring to FIGS. 4A and 4B, the lower chamfer path 8-1a is formed in the entire circumference scroll shape that the lower chamfer 8-1 makes one rotation the chamfer type blower body 4 to be connected to the lower discharge port 9-1.

Accordingly, each of the upper chamfer 5-1 and the lower chamfer 8-1 is formed with the scroll of the circumference shape with respect to the chamfer inclined type blower body of the bi-directional blower 1 at the angles that are changed depending upon the shapes of the upper discharge case 5 and the lower discharge case 8.

Figure 5:
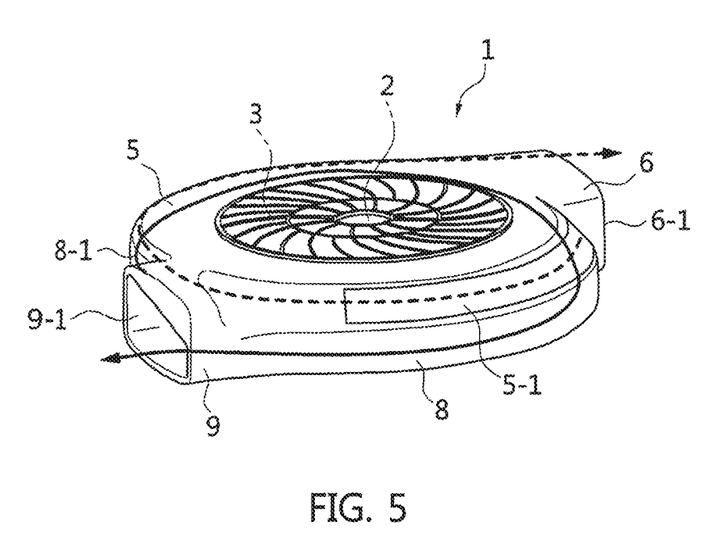
FIG. 5 is an example of a cross-sectional diagram of a discharge port applied to upper/lower discharge ports of the chamfer type blower body in accordance with an exemplary of the present disclosure.

Referring to the blowing function in FIG. 5, the rotation of the blade 3 by the motor 2 sucks the external air through upper/lower chamfer holes 5a, 8a. Then, the intake external air is discharged to the upper discharge port 6-1 along the scroll of the circumference shape formed by the upper chamfer path 5-1a in the chamfer type blower body 4, and simultaneously discharged to the lower discharge port 9-1 along the scroll of the circumference shape formed by the lower chamfer path 8-1a of the lower discharge case 8.

As a result, the intake external air is discharged in the opposite direction by the upper discharge port 6-1 and the lower discharge port 9-1. In this case, the upper discharge port 6-1 guides the discharge flow amount downward, while the lower discharge port 9-1 guides the discharge flow amount upward.

Thus, the bi-directional blower 1 implements the supply effect of the uniform flow amount by the entire circumference scroll shape of the upper/lower chamfer paths 5-1a, 8-1a.

Figure 6:
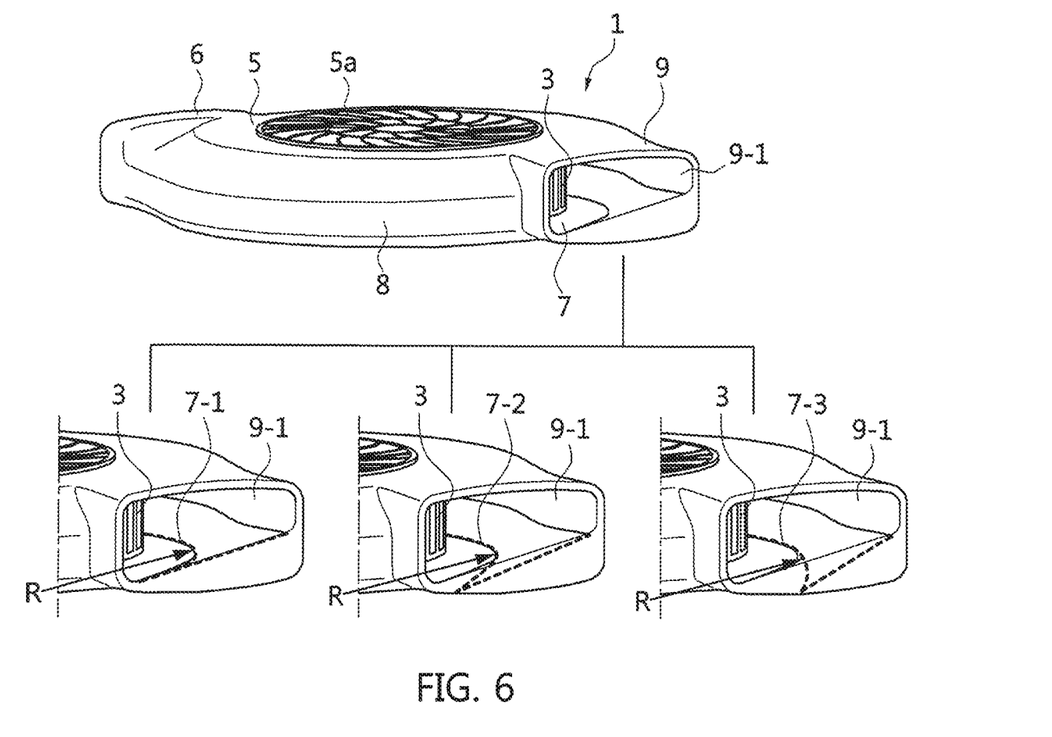
FIG. 6 is the state of blowing operation of the dual scroll type bi-directional blower in accordance with an exemplary of the present disclosure.

FIG. 6 illustrates a cross-sectional structure of the discharge port applied to each of the upper/lower discharge ports 6-1, 9-1 of the chamfer type blower body 4. In this case, it is illustrated as the cross-sectional structure of the discharge port of the lower discharge port 9-1, but the cross-sectional structure of the discharge port of the upper discharge port 6-1 is also formed to be the same as the cross-sectional structure of the discharge port of the lower discharge port 9-1.

As illustrated, the lower discharge port 9-1 is formed with an exit rib 7 by slightly protruding a bottom surface thereof. Particularly, a shape of the exit rib 7 is formed at the point where the lower chamfer path 8-1a meets the lower discharge port 9-1 to occupy the cross-sectional area of the lower discharge port 9-1 as much as the size of the exit rib 7.

Accordingly, the shape of the exit rib 7 blocks the shape of the r discharge port 9-1 at one side thereof to produce the deflection effect of the air flow amount that the air flow amount discharged from the lower discharge port 9-1 is more discharged to the space not blocked by the exit rib 7. Furthermore, a shape deformation of the exit rib 7 is formed on the upper discharge port 6-1 at the point where an upper chamfer path 6-1a meets the upper discharge port 6-1 to produce the same deflection effect of the air flow a mount as in the lower discharge port 9-1 even at the upper discharge port 6-1.

Furthermore, the shape of the exit rib 7 can change a size of an exit rib radius (R) producing the shape deformation thereof to change the deflection effect of the air flow amount.

As an example, based upon the size of the exit rib radius (R) of the exit rib 7-1 indicated at the left side of FIG. 6, the size of the exit rib radius (R) of the exit rib 7-2 indicted in the middle of FIG. 6 relatively more increases the deflection effect of the air flow amount, and the size of the exit rib radius (R) of the exit rib 7-3 indicated at the right side of FIG. 6 increases the deflection effect of the air flow amount relatively at maximum.

Thus, the size of the exit rib radius (R) can change the discharge flow amounts of the upper discharge port 6-1 and the lower discharge port 9-1 by the adjustment effect of the discharge flow amount.

As an example, the size of the exit rib radius (R) of the exit rib 7 at the upper discharge port 6-1 becomes great, while the size of the exit rib radius (R) of the exit rib 7 at the lower discharge port 9-1 relatively becomes small, and thus produces the adjustment effect of the discharge flow amount that the discharge flow amount of the lower discharge port 9-1 becomes greater than that of the upper discharge port 6-1.

On the other hand, the size of the exit rib radius (R) of the exit rib 7 at the lower discharge port 9-1 becomes great, while the size of the exit rib radius (R) of the exit rib 7 at the upper discharge port 6-1 relatively becomes small, and thus produces the adjustment effect of the discharge flow amount that the discharge flow amount of the upper discharge port 6-1 becomes greater than that of the lower discharge port 9-1.

Figure 7:
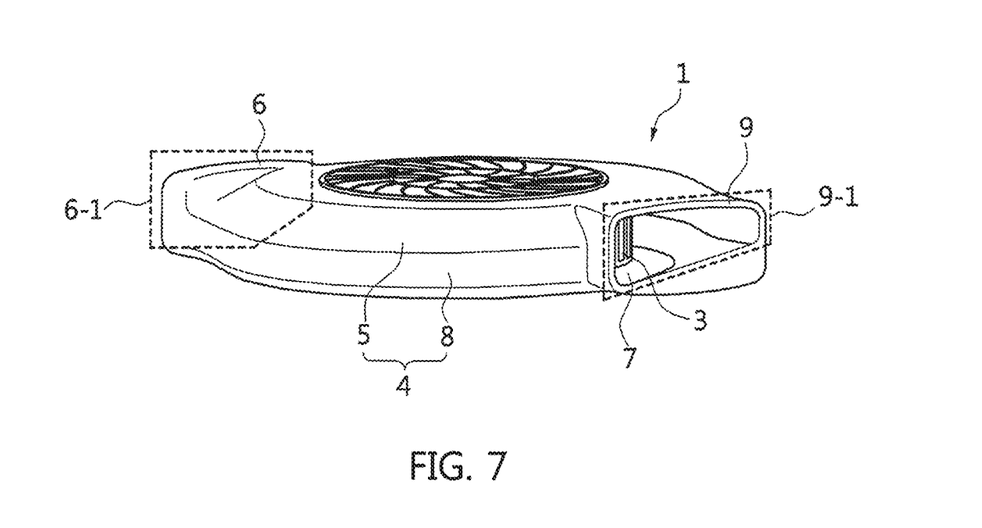
FIG. 7 is an example of a combination of the shape of the discharge port applied to the upper/lower discharge ports of the chamfer type blower body in accordance with an exemplary of the present disclosure.

FIG. 7 illustrates an example of a combination of the shape of the discharge port applied to the upper discharge port 6-1 and the lower discharge port 9-1, respectively.

As illustrated, the upper discharge port 6-1 has the shape inclined at one edge portion thereof from the rectangular-sectional shape, while the lower discharge port 9-1 has the shape inclined at the bottom surface from the rectangular-sectional shape.

Accordingly, the upper discharge port 6-1 produces the distribution effect of the air flow amount that discharges more the air flow amount per unit time than that of the lower discharge port 9-1.

Figure 8:
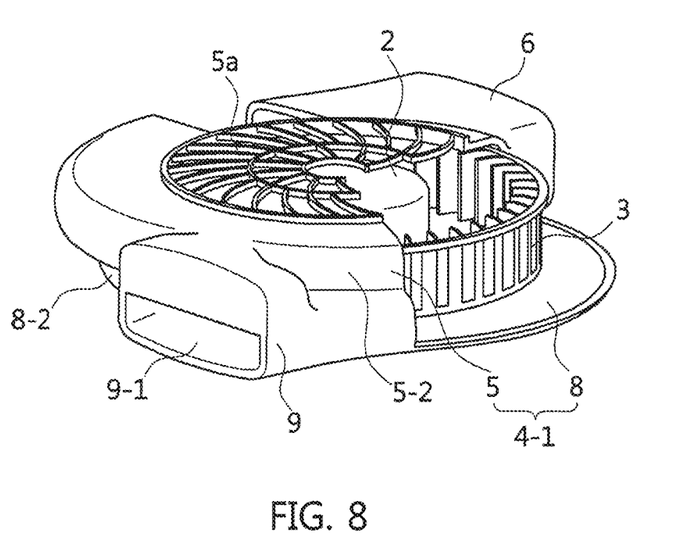
FIG. 8 is an example of a stepwise type blower body in accordance with an exemplary of the present disclosure.

FIG. 8 illustrates an example that the bi-directional blower 1 applies a stepwise type blower body instead of a chamfer inclined type blower body.

As illustrated, the stepwise type blower body is formed in a stepped shape instead of a chamfer inclined shape on the blower body to change the shape of the blower body into the stepwise type blower body 4-1. For this purpose, the stepwise type blower body 4-1 is composed of the upper discharge case 5 forming a upper step 5-2 of a stepwise structure instead of the cross-sectional inclined angles (a, a-1) of the upper chamfer 5-1, and the lower discharge case 8 forming a lower step 8-2 of a stepwise structure instead of the cross-sectional inclined angles (b, b-1) of the lower chamfer 8-1.

Accordingly, the upper step 5-2 forms the upper chamfer path 5-1a, and the upper chamfer path 5-1a is formed in the entire circumference scroll shape that the upper chamfer 5-1 makes one rotation the stepwise type blower body 4-1 to be connected to the upper discharge port 6-1. Furthermore, the lower step 8-2 forms the lower chamfer path 8-1a, and the lower chamfer path 8-1a is formed in the entire circumference scroll shape that the lower chamfer 8-1 makes one rotation the stepwise type blower body 4-1 to be connected to the lower discharge port 9-1.

Thus, the bi-directional blower 1 can be variously modified by meeting the requirement for flow amount and noise of the bi-directional blower 1 by changing only the shape thereof, such as the chamfer type blower body 4 in FIGS. 1 to 7 or the stepwise type blower body 4-1 in FIG. 8.

Figure 9:
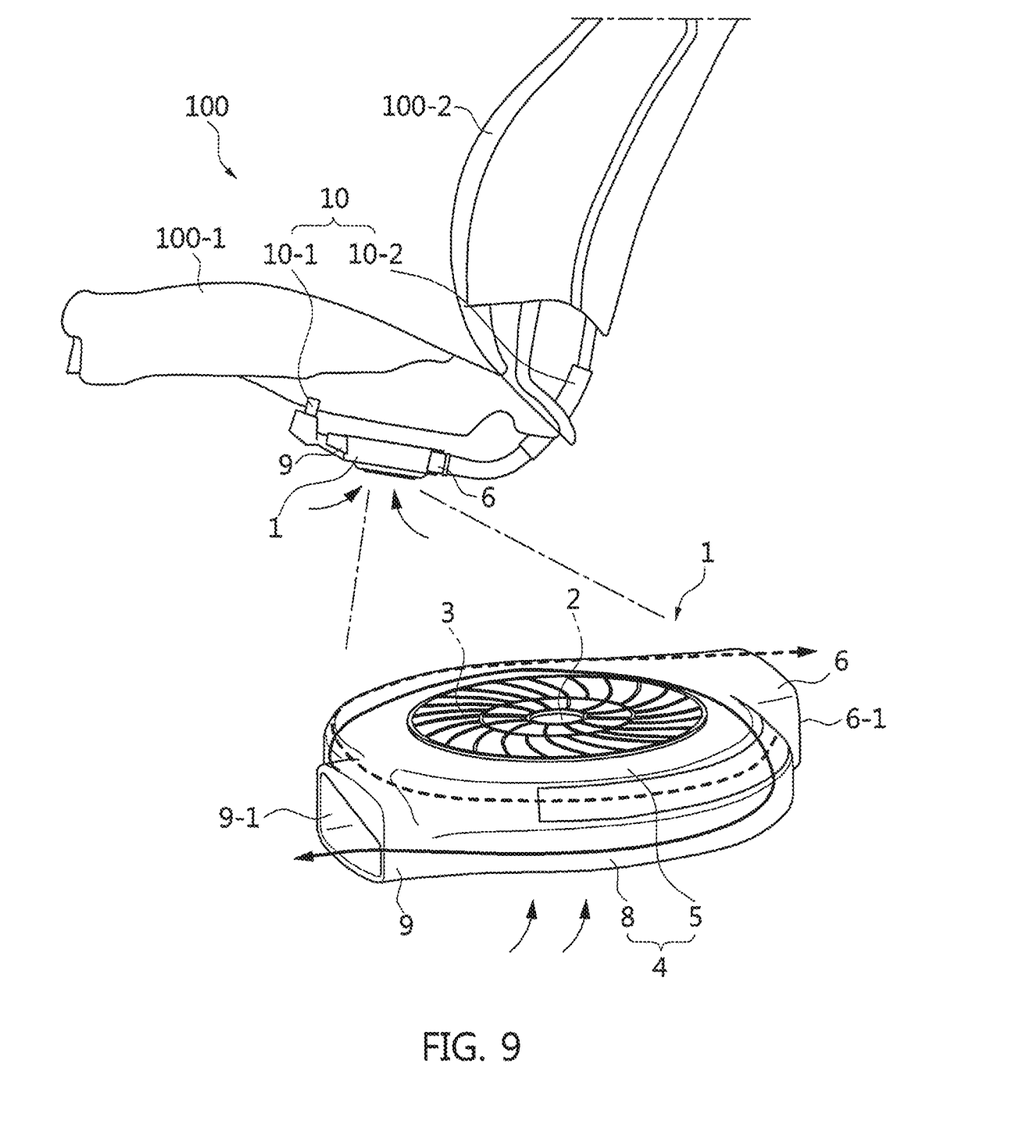
FIG. 9 is an example of a ventilation seat to which the dual scroll type bi-directional blower in accordance with an exemplary of the present disclosure is applied.

FIG. 9 is an example of a ventilation seat 100 to which the dual scroll type bi-directional blower 1 is applied.

As illustrated, the ventilation seat 100 includes a seat cushion 100-1 and a seat back 100-2 perpendicular thereto, and includes a blower duct 10 and the bi-directional blower 1 on the lower portion of the seat cushion 100-1.

Specifically, the ventilation seat 100 is the seat for a vehicle, the blower duct 10 is composed of a cushion duct 10-1 connected to the seat cushion 100-1 and a back duct 10-2 connected to the seat back 100-2. The bi-directional blower 1 is the same as the bi-directional blower 1 described through FIGS. 1 to 8.

However, the bi-directional blower 1 has the upper outlet 6 provided to the upper discharge case 5 of the chamfer type blower body 4 connected with the back duct 10-2, and thus the upper discharge port 6-1 is connected to the back duct 10-2. Furthermore, the lower outlet 9 provided to the lower discharge case 8 of the chamfer type blower body 4 is connected with the cushion duct 10-1, and thus the lower discharge port 9-1 is connected to the cushion duct 10-1.

Accordingly, if the bi-directional blower 1 is operated, the blade 3 sucks air from the lower space of the ventilation seat 100 by the rotation of the motor 2 to be injected into the chamfer type blower body 4.

Then, the intake air of the chamfer type blower body 4 makes one rotation the chamfer type blower body 4 through the upper chamfer path 5-1a of the upper chamfer 5-1 (or the upper chamfer path 5-1a of the upper step 5-2) to be discharged to the upper discharge port 6-1 to be sent to the back duct 10-2. At the same time, the intake air of the chamfer type blower body 4 makes one rotation the chamfer type blower body 4 through the lower discharge path 8-1a of the lower chamfer 8-1 (or the lower chamfer path 8-1a of the lower step 8-2) to be discharged to the lower discharge port 8-1 and to be sent to the cushion duct 10-1.

As a result, the ventilation seat 100 serves superior refreshing feeling by synergy operation to which the deflection effect of the air flow amount, the adjustment effect of the discharge flow amount, and the distribution effect of the air flow amount are added depending upon the characteristics of the upper discharge port 6-1 and the lower discharge port 8-1 on the basis of the supply effect of the uniform flow amount of the bi-directional blower 1 to the seat cushion 100-1 and the seat back 100-2.

As described above, the dual scroll type bi-directional blower 1 applied to the ventilation seat 100 in accordance with the present disclosure connects the blower duct 10 to the chamfer type blower body 4 or the stepwise type blower body 4-1 forming the inner space in which the blade 3 rotated by the motor 2 is received to send the intake air to the seat cushion 100-1 and the seat back 100-2, respectively, via the blower duct 10, thus improving the phenomena of a chronic shortage of the flow amount and occurrence of the noise of the bi-directional blower by a sufficient length of the scroll depending upon the entire circumference dual scroll shape of the chamfer type blower body 4 or the stepwise type blower body 4-1.

While the present disclosure has been described with respect to the specific embodiments, it will be apparent to those skilled in the art that various changes and modifications may be made without departing from the spirit and scope of the disclosure as defined in the following claims.

What is claimed is:

1. A bi-directional blower, comprising:
a blower body for guiding for air to flow along a stepwise structure of an entire circumference scroll shape of an inner space of the blower body,
wherein the blower body comprises:
an upper discharge case discharging air flow along the entire circumference scroll shape toward an upward space through an upper discharge port; and
a lower discharge case discharging the air flow along the entire circumference scroll shape toward a downward space through a lower discharge port,
wherein each of the upper discharge case and the lower discharge case has the entire circumference scroll shape as a chamfer.

2. The bi-directional blower of claim 1, wherein the blower body divides the inner space into the upward space and the downward space to guide the air flow.

3. The bi-directional blower of claim 1, wherein the entire circumference scroll shape of the upper discharge case is the chamfer connecting from the lower discharge port to the upper discharge port.

4. The bi-directional blower of claim 3, wherein the chamfer connecting from the lower discharge port to the upper discharge port has a cross-sectional inclined angle of an upper chamfer, and the cross-sectional inclined angle of the upper chamfer decreases from the cross-sectional inclined angle of the upper discharge port to the cross-sectional inclined angle of the lower discharge port.

5. The bi-directional blower of claim 1, wherein the entire circumference scroll shape of the lower discharge case is the chamfer connecting from the upper discharge port to the lower discharge port.

6. The bi-directional blower of claim 5, wherein the chamfer connecting from the upper discharge port to the lower discharge port has a cross-sectional inclined angle of a lower chamfer, and the cross-sectional inclined angle of the lower chamfer decreases from the cross-sectional inclined angle of the lower discharge port to the cross-sectional inclined angle of the upper discharge port.

7. The bi-directional blower of claim 1, wherein each of the upper discharge port and the lower discharge port guides the air flow in an air guide direction.

8. The bi-directional blower of claim 1, wherein each of the upper discharge port and the lower discharge port distributes an air flow amount by an area difference between cross-sectional shapes of the upper discharge port and the lower discharge port.

9. The bi-directional blower of claim 1, wherein each of the upper discharge port and the lower discharge port includes an exit rib, and
wherein a shape of the exit rib of each of the upper discharge port and the lower discharge ort adjusts an amount of the air flow discharging from the blower body.

10. The bi-directional blower of claim 9, wherein a shape deformation of the exit rib of each of the upper discharge port and the lower discharge port adjusts the discharge flow amount by changing a size of a cross-sectional area of each of the upper discharge port and the lower discharge port.

11. The bi-directional blower of claim 10, wherein the shape deformation of the exit rib of each of the upper discharge port and the lower discharge port changes the size of the cross-sectional area into a size of an exit rib radius.

12. The bi-directional blower of claim 1, wherein the entire circumference scroll shape of each of the upper discharge case and the lower discharge case has the stepwise structure.

13. The bi-directional blower of claim 12, wherein the entire circumference scroll shape of the upper discharge case has an upper step that is connected from the lower discharge port to the upper discharge port in the stepwise structure.

14. The bi-directional blower of claim 12, wherein the entire circumference scroll shape of the lower discharge case has a lower step that is connected from the upper discharge port to the lower discharge port in the stepwise structure.

15. The bi-directional blower of claim 1, wherein the blower body includes a blade rotating by a motor in the inner space of the blower body.

* * * * *